Figure 1:
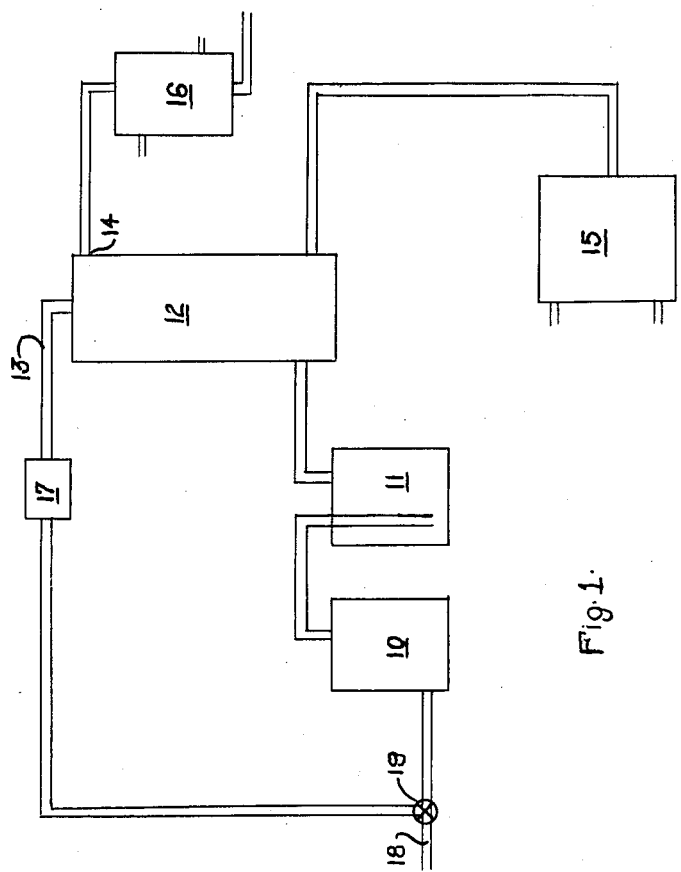

May 11, 1954   J. F. VILLARREAL   2,678,305
METHOD FOR BREAKING WATER AND OIL EMULSIONS
Filed Jan. 7, 1952

Juan F. Villarreal
INVENTOR.

BY

Patented May 11, 1954

2,678,305

UNITED STATES PATENT OFFICE 2,678,305

METHOD FOR BREAKING WATER AND OIL EMULSIONS

Juan F. Villarreal, State College, Pa.

Application January 7, 1952, Serial No. 265,310

8 Claims. (Cl. 252—340)

My invention is directed to a process for breaking emulsions of oil and water, particularly the emulsions of crude oil and water obtained from oil wells.

There have been several processes proposed for breaking crude oil and water emulsions such as the injection of atomized soap solutions into the emulsion, the addition of liquid or solid chemicals, the application of heat and similar expedients, but each of these has been subject to certain objections, as for example the necessity for careful control and proportioning of additives, for maintaining critical temperatures or pressures, or for mechanical agitation.

One of the principal objects of my invention is to provide a process for breaking an emulsion of oil, such as crude oil and water which is economical, efficient, utilizes inexpensive and easily available products, does not require close control and which employs a novel reaction not requiring the application of heat.

Other objects of my invention will be disclosed in the course of the following description and in the appended drawing in which the figure is a schematic diagram of my process.

My process contemplates the passage of a gas, preferably natural gas, through a dehydrating chamber 10 to remove substantially all water from the gas. Although various devices may be employed, a chamber filled with a suitable desiccant such as $CaCl_2$ has proven highly satisfactory for this purpose.

When dried, the gas is saturated with acetic acid vapor, this being accomplished simply and expeditiously by bubbling the gas through a quantity of concentrated acetic acid of commercial grade retained in a chamber 11. Since it is desirable to avoid carrying droplets of acetic acid into the system, the container 11 should be of sufficient capacity to define an air space above the acid of adequate volume to permit the settling of any acid droplets entrained by the rising gas stream.

The natural gas, saturated with acetic acid, is then introduced into the lower portion of a packed contact tower 12 of conventional design, where it passes upwardly to a gas outlet 13. The emulsion to be broken, in this instance crude oil and water, is introduced through an inlet 14 near the top of the tower 12, where it is divided by the packing material into a multiplicity of small, thin, falling streams. The gas carrying the acetic acid is thus brought into intimate contact with the emulsion, the acetic acid, in gaseous form reacting with the components to cause coalescence and segregation. As a result, the liquid collecting in the bottom of the tower 12 may be discharged to a settling tank 15 where the oil and water separate by gravity.

In a great majority of instances the viscosity of the emulsion will be sufficiently low to permit proper flow through the tower 12, but if the ambient temperature is low, the emulsion may be passed through a heater 16 before entering the tower 12. It will be understood that the sole purpose of such heating is to reduce the viscosity of the emulsion, since heat is not necessary to carry on the interaction of the acetic acid vapors with the emulsion.

The gas discharged from the tower 12 should be substantially free of acetic acid vapors, the rate of gas, flow being regulated to attain such result. The gas may thereafter be employed as fuel, since it does not enter into the reaction and serves only as a carrier. Pressure is neither beneficial or detrimental to the reaction, hence the only pressure differential required is that necessary to yield the desired gas flow. This may be obtained by a suitable compressor 17 discharging for example into the gas feed line 18 through a valve 19 upstream from the dehydrator 10.

In the foregoing description of my process nattural gas has been referred to as the carrier for the acetic acid vapor, but it should be understood that other gases may be employed. Furthermore the specific items of equipment described, while suitable, are mentioned solely for purposes of illustration and not by way of limitation since other forms of apparatus may obviously be employed for bringing acetic acid in gaseous form into intimate contact with the emulsion.

I claim:

1. The process for breaking an emulsion of oil and water which includes the step of bringing acetic acid in gaseous form into intimate contact with the emulsion.

2. The process for breaking an emulsion of crude oil and water which includes the step of bringing natural gas saturated with acetic acid vapor into intimate surface contact with the emulsion.

3. The process for breaking an emulsion of oil and water which includes the step of flowing the emulsion in a thin stream through a zone containing acetic acid in gaseous form.

4. The process for breaking an emulsion of oil and water which includes the steps dividing the emulsion into a plurality of small thin streams, flowing these streams through a zone in one direction and simultaneously flowing a gas including acetic acid in gaseous form through the chamber in the opposite direction.

5. The process for breaking an emulsion of oil in water which includes the steps of drying a gas, saturating the gas with acetic acid and bringing the mixture of gases into intimate contact with the emulsion.

6. The process for breaking an emulsion of crude oil and water which includes the steps of removing water from a stream of natural gas, passing the dried natural gas through liquid acetic acid, and separating entrained acid droplets from the resulting gas, passing the gas upwardly through a zone, and passing the emulsion downwardly through said zone in a plurality of thin streams.

7. The process defined in claim 6 which includes the step of recycling the gas.

8. The process defined in claim 2 which includes the steps of drying the gas and then saturating the gas with acetic acid.

References Cited in the file of this patent

UNITED STATES PATENTS

| Number | Name | Date |
| --- | --- | --- |
| 1,602,190 | Eddy et al. | Oct. 5, 1926 |
| 2,050,932 | De Groote | Aug. 11, 1936 |
| 2,470,611 | Towne | Oct. 9, 1951 |

OTHER REFERENCES

Dow—Methods Used for Dehydration of Oil-Field Emulsion—Bur. of Mines—Report of Investigations No. 2688, May 1925—p. 9.

Sherrick—Oil-Field Emulsions—Article in the Journal of Ind. and Eng. Chem.—vol. 12, No. 2—pp. 135 and 136, Feb. 1920.

Dodd—The Resolution of Petroleum Emulsions—Article in Chemical and Metallurgical Engineering—vol. 28—No. 6—p. 250.